United States Patent
Carroll

(10) Patent No.: US 9,469,082 B2
(45) Date of Patent: Oct. 18, 2016

(54) ASSEMBLY AND METHOD FOR CREATING CUSTOM STRUCTURES FROM PRINTABLE BLANK SHEETS

(71) Applicant: Blank Acquisition LLC, Brooklyn Park, MN (US)

(72) Inventor: Benjamin Todd Carroll, Brooklyn Park, MN (US)

(73) Assignee: Blank Acquisition LLC, Brooklyn Park, MN (US)

( * ) Notice: Subject to any disclaimer, the term of this patent is extended or adjusted under 35 U.S.C. 154(b) by 0 days.

(21) Appl. No.: 14/220,786

(22) Filed: Mar. 20, 2014

(65) Prior Publication Data

US 2015/0266261 A1    Sep. 24, 2015

(51) Int. Cl.
| | | |
|---|---|---|
| *B41F 33/00* | (2006.01) | |
| *B32B 3/26* | (2006.01) | |
| *B41F 21/00* | (2006.01) | |
| *B32B 7/14* | (2006.01) | |
| *B32B 7/06* | (2006.01) | |
| *B32B 27/10* | (2006.01) | |
| *B32B 27/30* | (2006.01) | |
| *B32B 27/32* | (2006.01) | |
| *B32B 27/36* | (2006.01) | |

(52) U.S. Cl.
CPC ............. *B32B 3/266* (2013.01); *B32B 7/06* (2013.01); *B32B 7/14* (2013.01); *B32B 27/10* (2013.01); *B32B 27/304* (2013.01); *B32B 27/32* (2013.01); *B32B 27/36* (2013.01); *B41F 21/00* (2013.01); *B32B 2307/518* (2013.01); *B32B 2307/748* (2013.01); *B32B 2307/75* (2013.01); *B32B 2439/62* (2013.01); *B32B 2451/00* (2013.01); *Y10T 428/15* (2015.01)

(58) Field of Classification Search
CPC ................................ B41L 47/02; B41F 23/06
See application file for complete search history.

(56) References Cited

U.S. PATENT DOCUMENTS

| | | | | |
|---|---|---|---|---|
| 4,691,858 | A | * | 9/1987 | Peer, Jr. .................... 229/217 |
| 5,219,183 | A | | 6/1993 | McKillip |
| 5,462,488 | A | | 10/1995 | McKillip |
| 5,466,013 | A | | 11/1995 | Garrison |
| 5,589,025 | A | | 12/1996 | Garrison |
| 5,595,403 | A | | 1/1997 | Garrison |
| 5,736,212 | A | | 4/1998 | Fischer |
| 5,782,497 | A | | 7/1998 | Casagrande |
| 5,890,743 | A | | 4/1999 | Garrison et al. |
| 6,022,051 | A | | 2/2000 | Casagrande |
| 6,294,237 | B1 | * | 9/2001 | Popat ........................ 428/40.1 |
| 6,328,340 | B1 | * | 12/2001 | Fischer ....................... 283/62 |

(Continued)

OTHER PUBLICATIONS

Promotional Products You Can Print on | Blanks/USA, http://www.blanksusa.com/products/promotional-products Jun. 20, 2014, 2 pages.

Dimensional | Mohawk Connects, http://www.mohawkconnects.com/products/digital/mohawk-dimensional, Jun. 20, 2014, 2 pages.

(Continued)

*Primary Examiner* — Matthew G Marini
(74) *Attorney, Agent, or Firm* — Kinney & Lange, P.A.

(57) ABSTRACT

A printable blank sheet includes a sheet with a top substrate and a bottom layer, a dry lift adhesive connecting the top substrate to the bottom layer, cut lines in the sheet that extend through the top substrate and the dry lift adhesive but not through the bottom layer, and an object with an intricate shape cut into the top substrate with a periphery of the object defined by the cut lines. The object can be removed from the sheet by separating the object and the bottom layer along the dry lift adhesive.

19 Claims, 14 Drawing Sheets

(56) References Cited

U.S. PATENT DOCUMENTS

| | | | |
|---|---|---|---|
| 6,358,587 B1* | 3/2002 | Saint et al. | 428/40.1 |
| 6,585,845 B1 | 7/2003 | Peterson | |
| 6,991,259 B2 | 1/2006 | Schwarzbauer et al. | |
| 7,260,907 B2 | 8/2007 | Sturba et al. | |
| 8,530,020 B2 | 9/2013 | McCarthy et al. | |
| 2007/0114789 A1* | 5/2007 | Morrish | 283/107 |
| 2010/0038897 A1* | 2/2010 | Porter | 283/58 |

OTHER PUBLICATIONS

Light Fab Fold-Ups—Lightfab.com—Fold, Ups, Ups, Fold Ups, Foldup . . . , http://lightfab.com/products/Light_Fab_Fold_Ups, Jun. 20, 2014, 1 page.

Relyco Business Solutions—Relyco Digipop Custom Digital Packaging . . . , http://www.relyco.com/indes.php/products/digipop-packaging-solutions, Jun. 20, 2014, 8 pages.

* cited by examiner

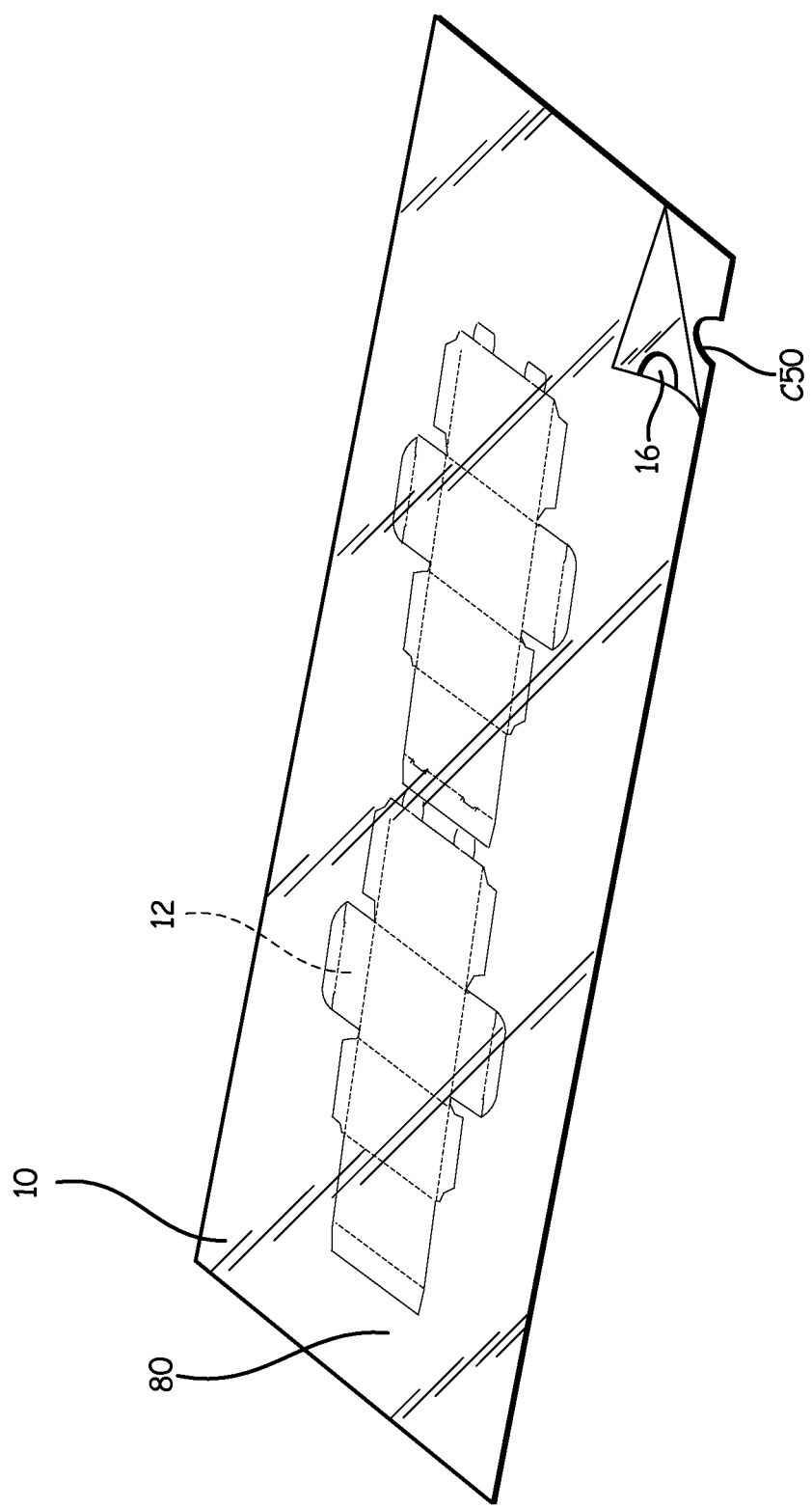

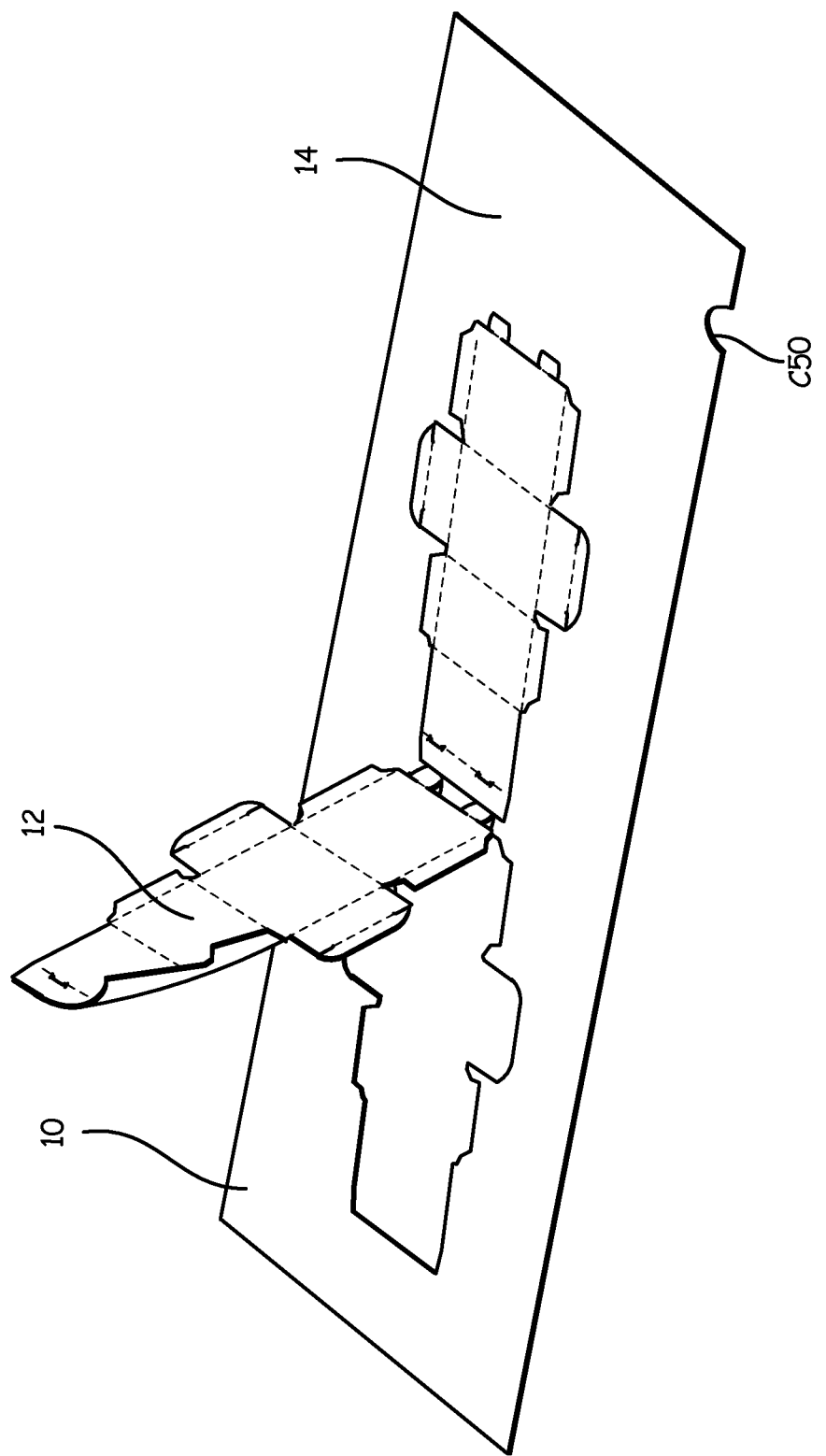

ASSEMBLY AND METHOD FOR CREATING CUSTOM STRUCTURES FROM PRINTABLE BLANK SHEETS

BACKGROUND

The present invention relates to printable blank sheets, and in particular, to printable blank sheets that are capable of being formed into custom structures.

Custom print materials have become a common way for businesses to market themselves. Custom print materials that are typically used in advertising include two-dimensional products like postcards, flyers and door hangers, as well as three-dimensional products like golf ball boxes, candy boxes and pop-up calendars. Typically, custom print materials are sent to print shops that specialize in preparing custom print materials, as the materials have had to be printed and assembled by specialized machines. As a result, having custom print materials made can be costly and time-consuming. Further, specialty print shops typically require custom print materials to be ordered in large amounts.

Some printable blank templates are currently available for creating custom print materials without having to send them to print shops. These templates are die-cut with perforations and scored lines. The perforations surround the desired shape of the object and the scored lines indicate where the object should be folded if the object is a three-dimensional structure. The drawback to the currently available die-cut templates is that it is hard to detach the desired object from the excess sheet when the objects have an intricate shape. Trying to separate the perforated lines often causes tearing of the object, which affects the strength and image of the resulting structure. The perforations surrounding the object can also leave rough edges on the structure where the perforations were torn apart. Further, it is time consuming to remove the objects from the sheet, especially if taking care not to tear the object as it is removed from the sheet.

SUMMARY

A printable blank sheet comprises a sheet with a top substrate and a bottom layer, a dry lift adhesive connecting the top substrate to the bottom layer, cut lines in the sheet that extend through the top substrate and the dry lift adhesive but not through the bottom layer, and an object with an intricate shape cut into the top substrate with a periphery of the object defined by the cut lines. The object can be removed from the sheet by separating the object and the bottom layer along the dry lift adhesive.

A method of creating a custom print object includes running a printable blank sheet through a printer. The sheet includes a top substrate that is attached to a back layer with a dry lift adhesive. The sheet has cut lines extending through the top substrate and the dry lift adhesive but not through the back layer. The cut lines define a periphery of an object with an intricate shape formed in the top substrate of the sheet. The method further includes separating the object from the back layer along the dry lift adhesive.

BRIEF DESCRIPTION OF THE DRAWINGS

FIG. 9A is a perspective view of the printable blank sheet as a corner of a film layer is being lifted.

FIG. 9C is a perspective view of the printable blank sheet as an object is removed from an excess sheet area.

DETAILED DESCRIPTION

In general, the present disclosure describes a printable blank sheet that is capable of being printed on to form custom structures. The printable blank sheet includes a plurality of layers, including a printable substrate, a dry lift adhesive, and a film layer. A periphery of an object with an intricate shape can be defined in the printable blank sheet by cutting through the printable substrate and the dry lift adhesive but not through the film layer. The dry lift adhesive holds the printable substrate on the film layer after the object has been cut out of the printable substrate so that the printable blank sheet can be run through a printer. After the printable blank sheet has been printed on, the object can be separated from the film layer along the dry lift adhesive. A majority of the dry lift adhesive will remain on the film layer after the object has been removed. The dry lift adhesive has a dry release so neither the object nor the film layer will have a sticky residue on them after the object is separated from the film layer. If the object is a flat for a three-dimensional structure, the object can then be assembled by folding the object along scored lines and using tabs and die-cuts to assemble the object.

Providing a printable blank sheet with a dry lift adhesive between a printable substrate and a film layer is advantageous. First, the dry lift adhesive will hold the printable substrate on the film layer even after a periphery of the object is cut through the printable substrate. This allows the printable blank sheet to be run through the printer. This also allows the object to be quickly removed from the sheet, as the object has to be merely pulled out of the sheet. Second, cutting through the printable substrate and the dry lift adhesive will leave the object with clean edges after it has been removed from the printable blank sheet. Third, the printable substrate includes a film layer to provide strength to the printable substrate. This will prevent the object from being torn when it is removed from the printable blank sheet.

Further, the film layer on the object will allow the object to be moisture resistant and will give the object a greater strength.

Figure 1:
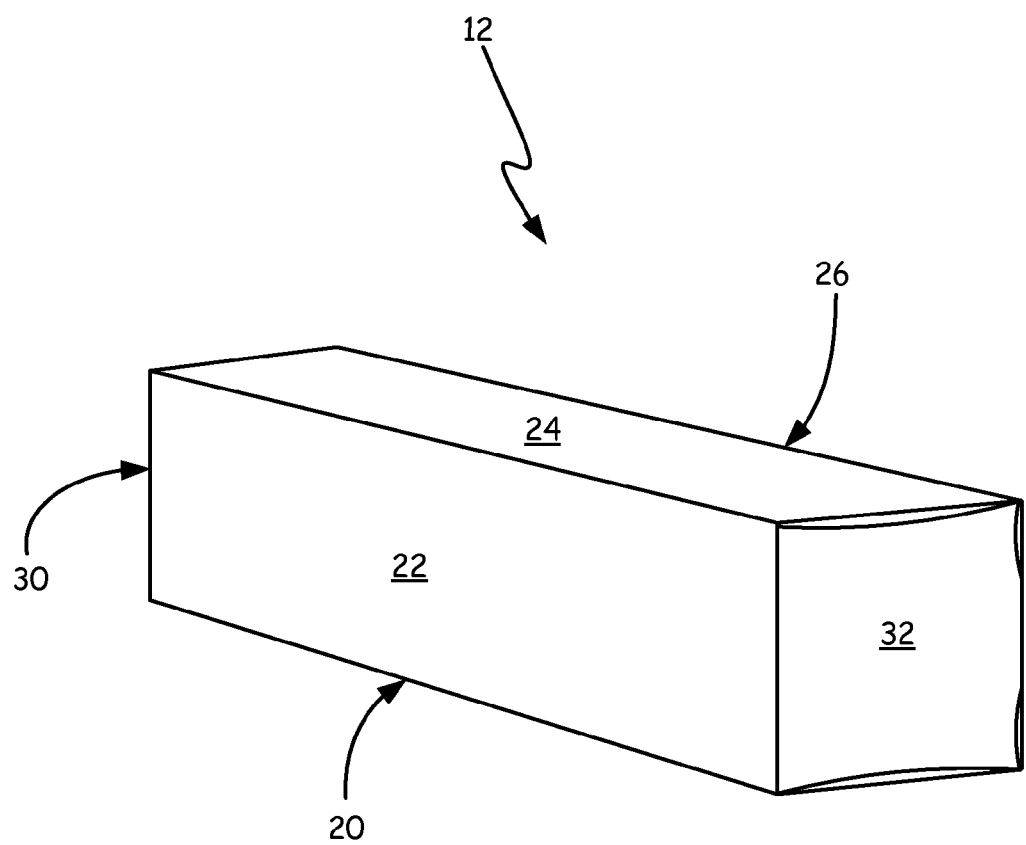
FIG. 1 is a perspective view of a golf ball box.

FIG. 1 is a perspective view of box 12. Box 12 includes side faces 20, 22, 24, and 26, and end faces 30 and 32.

In the embodiment shown in FIG. 1, box 12 is a golf ball box. Side face 20 is connected to side face 22. Side face 22 is connected to side face 20, side face 24, end face 30 and end face 32. Side face 24 is connected to side face 22 and side face 26. Side face 26 is connected to side face 24. In alternate embodiments, box 12 can be a box with any size and shape or any other three-dimensional structure that is capable of being formed from a blank sheet.

Box 12 is formed by bending a flat box into a three-dimensional structure that is capable of holding golf balls. Side face 26 and side face 20 are attached with tabs and die-cut lines. End face 30 and end face 32 can be opened and closed so that golf balls can be placed in and taken out of box 12. Forming box 12 from a flat allows for individual customization of box 12, by providing a way to print a custom image on box 12 before it is assembled. This allows businesses to create their own custom printed marketing materials, which can save money compared to ordering custom printed marketing materials from specialty print shops.

Figure 2:
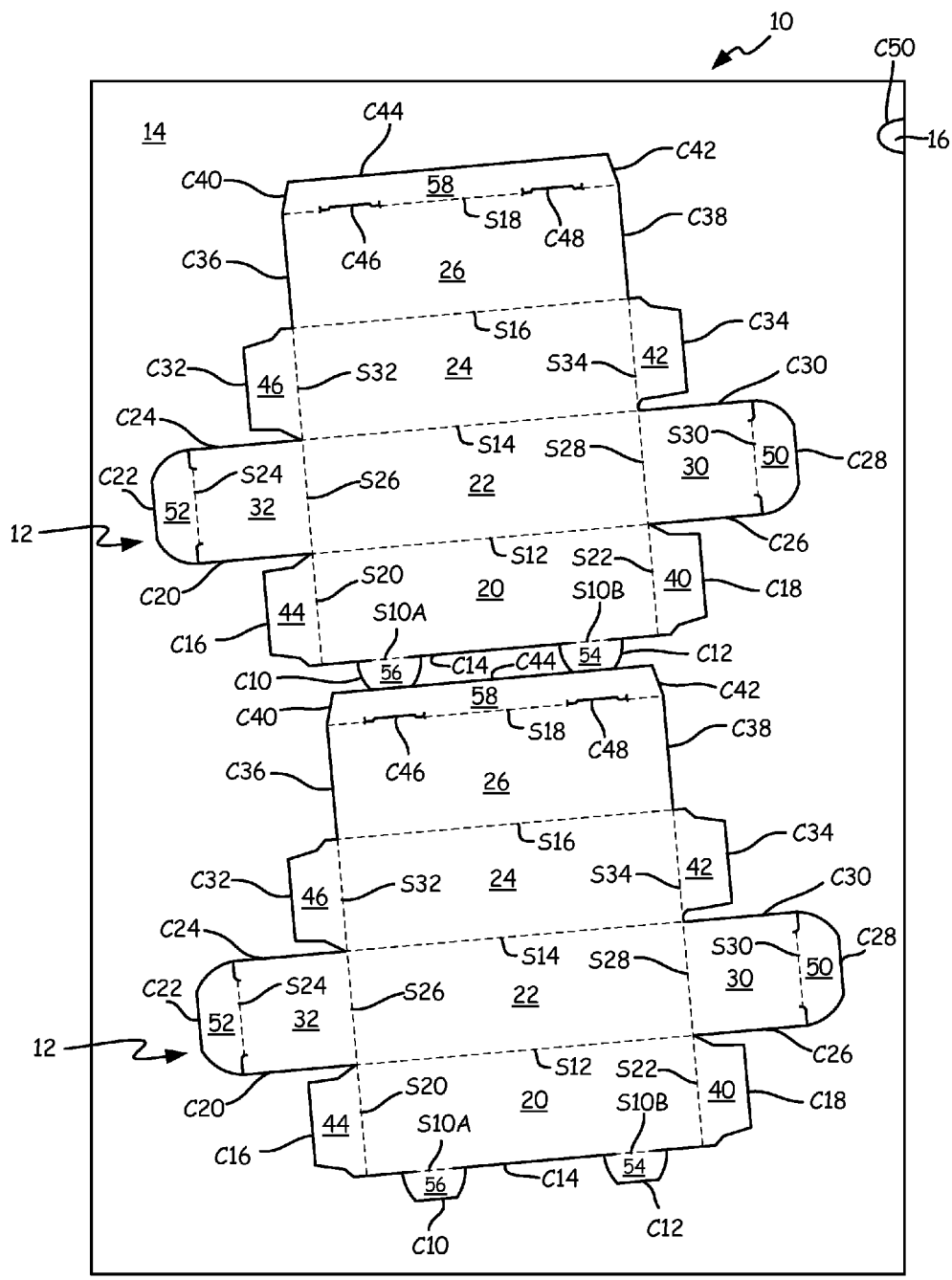
FIG. 2 is a top view of a printable blank sheet with two objects defined in the sheet.

FIG. 2 is a top view of printable blank sheet 10 with two objects 12 defined in printable blank sheet 10. Printable blank sheet 10 includes objects 12, excess sheet area 14, notch 16, cut lines C (C10, C12, C14, C16, C18, C20, C22, C24, C26, C28, C30, C32, C34, C36, C38, C40, C42, C44, C46, C48, and C50), and scored lines S (S10A, S10B, S12, S14, S16, S18, S20, S22, S24, S26, S28, S30, S32 and S34). Each object 12 includes side panels 20, 22, 24, and 26, end panels 30 and 32, side tabs 40, 42, 44, 46, 54, and 56, and end tabs 50, 52, and 58.

Printable blank sheet 10 is a flat sheet that is capable of being run through a printer. Printable blank sheet 10 includes a plurality of layers, including a printable substrate attached to a film layer with a dry lift adhesive. Objects 12 are positioned on printable blank sheet 10 and are capable of being removed from printable blank sheet 10 to be assembled into three-dimensional structures. Excess sheet area 14 surrounds objects 12. After objects 12 have been removed from printable blank sheet 10, excess sheet area 14 can be discarded. Cut lines C10-C48 define the peripheries of objects 12 along which objects 12 can be removed from printable blank sheet 10. Cut lines C10-C48 extend through the printable substrate and dry lift adhesive layers of printable blank sheet 10 but not through the film layer. Scored lines S are placed on objects 12 and define areas where objects 12 can be folded. Scored lines S are areas where printable blank sheet 10 has been put under pressure to create a line of weakness in printable blank sheet 10 along which printable blank sheet 10 can be easily folded. Printable blank sheet 10 further includes notch 16. Cut line C50 defines the periphery of notch 16 and extends through the printable substrate and dry lift adhesive layers of printable blank sheet 10 but not through the film layer. Notch 16 allows a user to separate the printable substrate from the film layer along the dry lift adhesive.

Objects 12 are positioned on printable blank sheet 10 at an angle with respect to the edges of printable blank sheet 10. This is done for manufacturing purposes, as it allows for greater precision when cutting cut lines C through the printable substrate and the dry lift adhesive but not through the film layer. When printable blank sheet 10 is manufactured, a roller die can be used to create cut lines C in printable blank sheet 10. When a roller die is used to cut lines that are parallel with the edges of printable blank sheet 10 there is a lot of pressure between the roller die and printable blank sheet 10, as the roller die is pushing back as it cuts through printable blank sheet 10. Angling objects 12 on printable blank sheet 10 reduces the pressure between the roller die and printable blank sheet 10, as the angled positioning of objects 12 means every cut line C is angled with respect to the edges of printable blank sheet 10. This allows the roller die to cut into printable blank sheet 10 with greater precision, as the pressure between the roller die and printable blank sheet 10 is reduced. This allows cut lines C to only extend through the printable substrate and the dry lift adhesive but not through the film layer.

As shown in FIG. 2, each object 12 has side panel 20, side panel 22, side panel 24, side panel 26, end panel 30, end panel 32, side tab 40, side tab 42, side tab 44, side tab 46, end tab 50, end tab 52, side tab 54, side tab 56, and end tab 58.

Side panel 20 has sides C14, S22, S12 and S20. Side panel 20 is connected to side tab 56 along scored line S10A and to side tab 54 along scored line S10B. The outline of side tab 56 is defined by cut line C10 and the outline of side tab 54 is defined by cut line C12. Side panel 20 is connected to side tab 44 along scored line S20. The outline of side tab 44 is defined by cut line C16. Side panel 20 is connected to side tab 40 along scored line S22. The outline of side tab 40 is defined by cut line C18. Side panel 20 is connected to side panel 22 along scored line S12.

Side panel 22 has sides S12, S26, S28 and S14. Side panel 22 is connected to side panel 20 along scored line S12 and to side panel 24 along scored line S14. Side panel 22 is connected to end panel 32 along scored line S26 and to end panel 30 along scored line S28. End panel 32 has sides S26, C20, S24 and C24. End panel 32 is connected to end tab 52 along scored line S24. The outline of end tab 52 is defined by cut line C22. End panel 30 has sides S28, C26, S30, and C30. End panel 30 is connected to end tab 50 along scored line S30. The outline of end tab 50 is defined by cut line C28.

Side panel 24 has sides S14, S32, S34 and S16. Side panel 24 is connected to side panel 22 along scored line S14 and to side panel 26 along scored line S16. Side panel 24 is connected to side tab 46 along scored line S32 and to side tab 42 along scored line S34. The outline of side tab 46 is defined by cut line C32 and the outline of side tab 42 is defined by cut line C34.

Side panel 26 has sides S16, C36, S18 and C38. The outline of side panel 26 is defined on opposite sides by cut lines C36 and C38. Side panel 26 is connected to side panel 24 by scored line S16. Side panel 26 is connected to end tab 58 along scored line S18. The outline of end tab 58 is defined by cut lines C40, C42 and C44.

Printable blank sheet 10 can be run through a printer or copier to have an image printed on it. After printing, objects 12 can be removed from printable blank sheet 10. Objects 12 will then be free-standing. The outline of objects 12 are defined by cut lines C. In the embodiment shown in FIG. 2, objects 12 are flats with tabs extending outward from a main body portion and scored lines and die cut lines on the main body portion of the flat, giving objects 12 an intricate shape.

Objects 12 can be folded along scored lines S to form three-dimensional structures. Scored lines S12, S14, S16 and S18 can be folded into approximately 90 degree angles so that side panels 20, 22, 24 and 26 are at approximately 90 degree angles to the side panels they are attached to. Side tabs 54 and 56 can be folded along scored lines S10B and S10A, respectively. Side tab 54 can be inserted into cut line C48 and side tab 56 can be inserted into cut line C46. This holds boxes 12 in three-dimensional rectangular shapes. Side tabs 40, 42, 44 and 46 can be folded along scored lines S22, S34, S20 and S32, respectively, to fold side tabs 40, 42, 44 and 46 inward. End panels 30 and 32 can then be folded inward along scored lines S28 and S26, respectively, and end tabs 50 and 52 can be folded inward along scored lines S30 and S24, respectively. End tab 50 can be inserted into the gap that is formed between side panel 26 along cut line C38 and the rest of the box. End tab 52 can be inserted into the gap that is formed between side panel 26 along cut line C36 and the rest of the box.

Forming objects 12 from printable blank sheet 10 is advantageous, as it allows a user to create custom print materials without having to order the materials from specialty print shops. This saves time and money for the user. Further, previous printable blank sheets had perforations or bridges surrounding the periphery of objects 12 to hold objects 12 in printable blank sheet 10 when printable blank sheet 10 was sent through a printer. Using perforations or bridges to hold objects 12 in printable blank sheet 10 made it difficult to remove objects 12 from printable blank sheet 10 after printing, as the perforations or bridges needed to be weakened before they were separated. Trying to weaken the perforations or bridges was difficult due to the irregular placement of the perforations or bridges along the periphery of the flat object. Thus, it was difficult to remove objects 12 without tearing body portions of objects 12. Further, the intricate features of objects 12 were easily torn, which ruined the part and made it unsuitable for use as a marketing material. The perforations and bridges also left rough edges on the periphery of the object after they were torn. Further, it was time consuming to remove objects 12, as time had to be taken to separate each individual side of object 12.

Using a dry lift adhesive to hold a printable substrate on a film layer eliminates the necessity of having perforations or bridges surrounding the peripheries of objects 12, as the dry lift adhesive will hold objects 12 in printable blank sheet 10 as printable blank sheet 10 is sent through a printer. Thus, cut lines C can surround the entire periphery of objects 12. Having cut lines C surround the entire periphery of objects 12 is advantageous, as objects 12 will have clean edges when they are removed from printable blank sheet 10. Having clean edges makes objects 12 more presentable and suitable for use as marketing materials. Further, objects 12 can be more easily removed from printable blank sheet 10 compared to previous printable blank sheets, which will reduce or eliminate tearing of objects 12 as they are removed from printable blank sheet 10. It also saves significant time, as objects 12 can be peeled out of printable blank sheet 10 in seconds. This also allows objects 12 to have more intricate shapes than was previously possible.

Notch 16 is also advantageous, as it allows a user to begin separating the printable substrate from the film layer. A user can grasp notch 16 and pull the film layer away from the printable substrate along the dry lift adhesive. Objects 12 can then be removed from excess sheet area 14, as cut lines C surrounding objects 12 are cut through the printable substrate. Separating the objects from the film layer using notch 16 allows a user to remove objects 12 from printable blank sheet 10 very quickly and efficiently. It also prevents objects 12 from being torn or otherwise damaged when they are removed from printable blank sheet 10.

When objects 12 are removed from printable blank sheet 10, they will be made out of the printable substrate layer of printable blank sheet 10. The printable substrate can include a film layer. The film layer will make objects 12 stronger than previous paper structures and the film layer will make objects 12 moisture resistant. This allows objects 12 to be used in more settings, as stronger materials can be placed in objects 12 once they are assembled into three-dimensional structures and objects 12 can be used in harsher environments than was previously possible.

Figure 3:
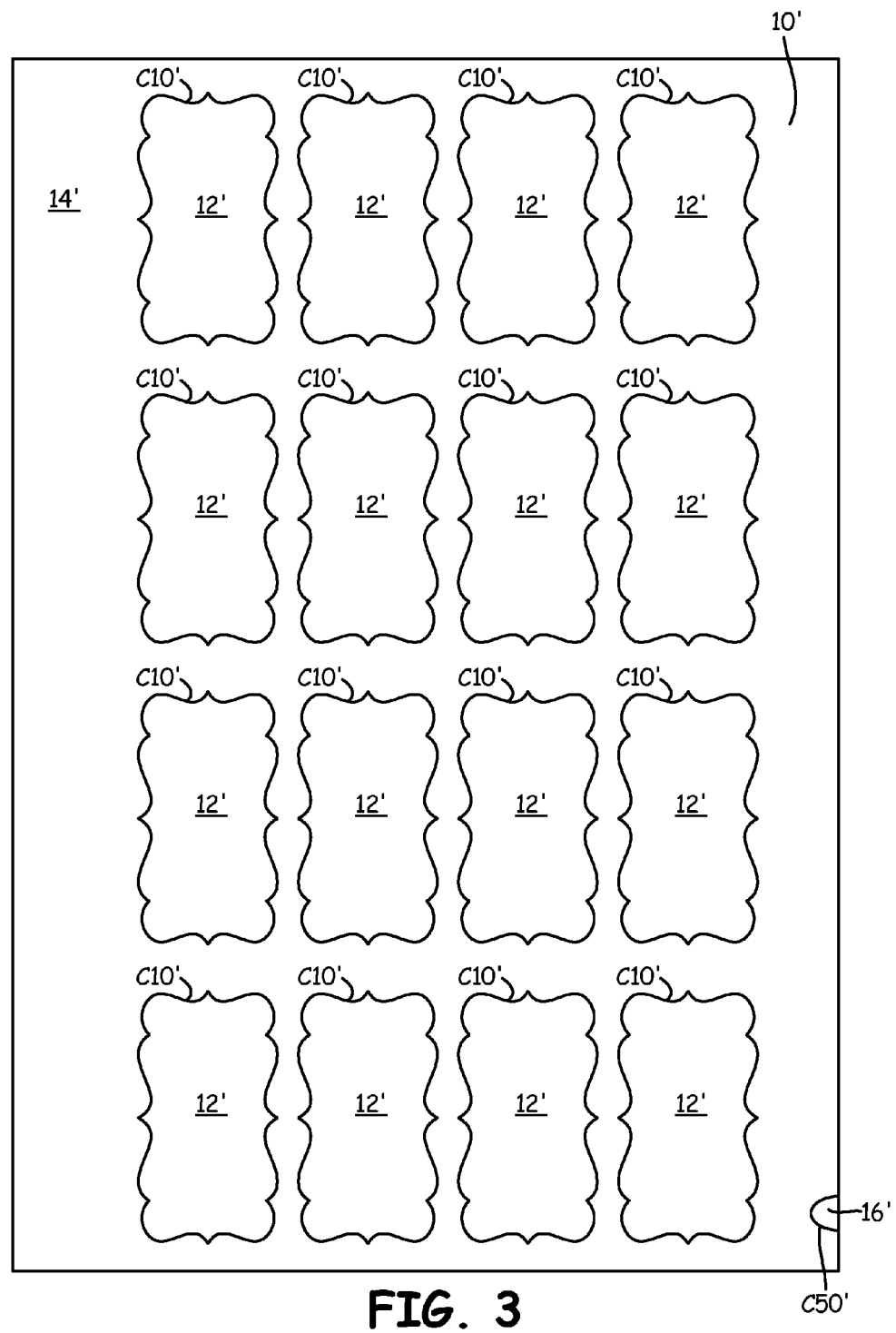
FIG. 3 is a top view of a printable blank sheet with a plurality of objects defined in the sheet.

FIG. 3 is a top view of printable blank sheet 10' with a plurality of objects 12' defined in printable blank sheet 10'. Printable blank sheet 10' includes objects 12', excess sheet area 14', notch 16', and cut lines C' (C10' and C50').

Printable blank sheet 10' is a flat sheet that is capable of being run through a printer. Printable blank sheet 10' includes a plurality of layers, including a printable substrate attached to a film layer with a dry lift adhesive. Objects 12' are positioned on printable blank sheet 10' and are capable of being removed from printable blank sheet 10'. Objects 12' have an intricate shape with multiple curved lines. Excess sheet area 14' surrounds objects 12'. After objects 12' have been removed from printable blank sheet 10', excess sheet area 14' can be discarded. Cut lines C10' define the peripheries of objects 12' along which objects 12' can be removed from printable blank sheet 10'. Cut lines C10' extend through the printable substrate and dry lift adhesive layers of printable blank sheet 10' but not through the film layer. Printable blank sheet 10' further includes notch 16'. Cut line C50' defines the periphery of notch 16' and extends through the printable substrate and dry lift adhesive layers of printable blank sheet 10' but not through the film layer. Notch 16' allows a user to separate the printable substrate from the film layer along the dry lift adhesive.

Printable blank sheet 10' can be run through a printer or copier to have an image printed on it. After printing, objects 12' can be removed from printable blank sheet 10'. Objects 12' will then be free-standing. The outline of objects 12' are defined by cut lines C10'. In the embodiment shown in FIG. 3, objects 12' are cards with scalloped edges, giving objects 12' an intricate shape.

Forming objects 12' from printable blank sheet 10' is advantageous, as it allows a user to create custom print materials without having to order the materials from specialty print shops. This saves time and money for the user. Further, previous printable blank sheets had perforations or bridges surrounding the periphery of objects 12' to hold objects 12' in printable blank sheet 10' when printable blank sheet 10' was sent through a printer. Using perforations or bridges to hold objects 12' in printable blank sheet 10' made it difficult to remove objects 12' from printable blank sheet 10' after printing, as the perforations or bridges needed to be weakened before they were separated. Trying to weaken the perforations or bridges was difficult due to the irregular placement of the perforations or bridges along the periphery of the flat object. Thus, it was difficult to remove objects 12' without tearing body portions of objects 12'. Further, the intricate features of objects 12' were easily torn, which ruined the part and made it unsuitable for use as a marketing material. The perforations and bridges also left rough edges on the periphery of the object after they were torn. Further, it was time consuming to remove objects 12', as time had to be taken to separate each individual side of object 12'.

Using a dry lift adhesive to hold a printable substrate on a film layer eliminates the necessity of having perforations or bridges surrounding the peripheries of objects 12', as the dry lift adhesive will hold objects 12' in printable blank sheet 10' as printable blank sheet 10' is sent through a printer. Thus, cut lines C' can surround the entire periphery of objects 12'. Having cut lines C' surround the entire periphery of objects 12' is advantageous, as objects 12' will have clean edges when they are removed from printable blank sheet 10'. Having clean edges makes objects 12' more presentable and suitable for use as marketing materials. Further, objects 12' can be more easily removed from printable blank sheet 10' compared to previous printable blank sheets, which will reduce or eliminate tearing of objects 12' as they are removed from printable blank sheet 10'. It also saves significant time, as objects 12' can be peeled out of printable blank sheet 10' in seconds. This also allows objects 12' to have more intricate shapes than was previously possible.

Notch 16' is also advantageous, as it allows a user to begin separating the printable substrate from the film layer. A user can grasp notch 16' and pull the film layer away from the printable substrate along the dry lift adhesive. Objects 12' can then be removed from excess sheet area 14', as cut lines C' surrounding objects 12' are cut through the printable substrate. Separating the objects from the film layer using notch 16' allows a user to remove objects 12' from printable blank sheet 10' very quickly and efficiently. It also prevents objects 12' from being torn or otherwise damaged when they are removed from printable blank sheet 10'.

When objects 12' are removed from printable blank sheet 10', they will be made out of the printable substrate layer of printable blank sheet 10'. The printable substrate can include a film layer. The film layer will make objects 12' stronger than previous paper structures and the film layer will make objects 12' moisture resistant. This allows objects 12' to be used in more settings, as objects 12' can be used in harsher environments than was previously possible.

Figure 4A:
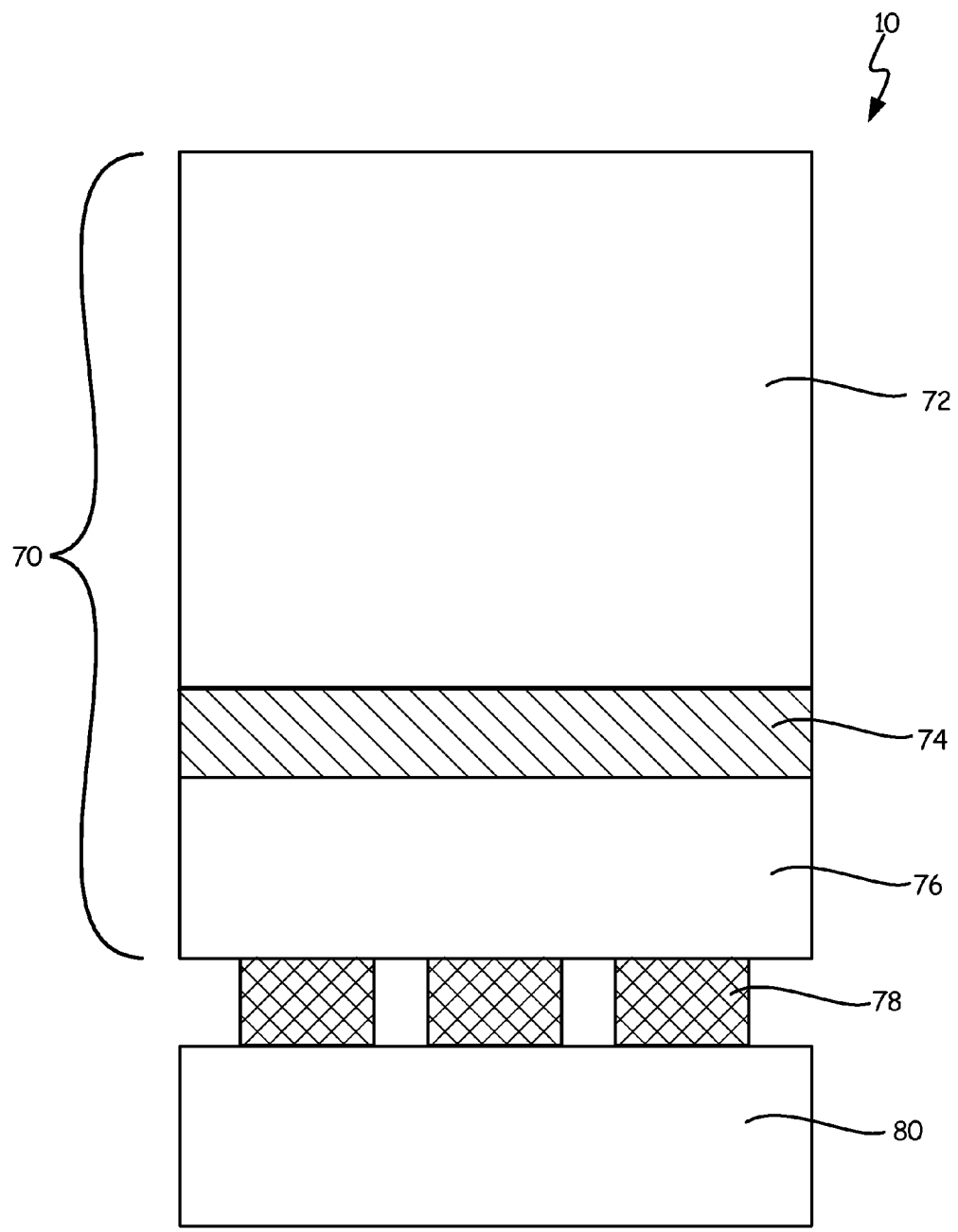
FIG. 4A is a side cross-sectional view of the printable blank sheet showing the layers of material in the printable blank sheet.
Figure 4B:
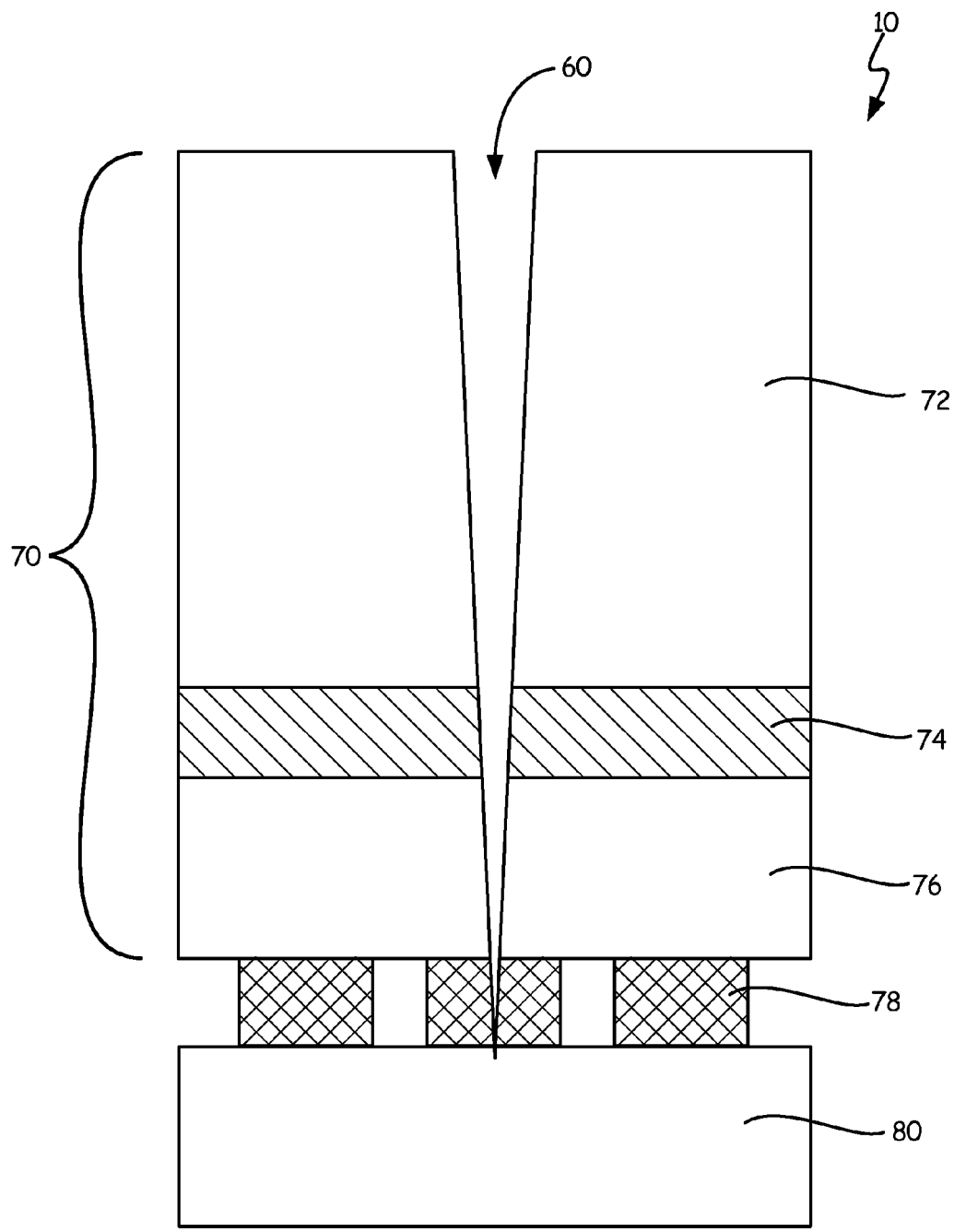
FIG. 4B is a side cross-sectional view of the printable blank sheet after it has been cut.

FIG. 4A is a side cross-sectional view of printable blank sheet 10 showing the layers of material in printable blank sheet 10. FIG. 4B is a side cross-sectional view of printable blank sheet 10 after it has been cut. Printable blank sheet 10 includes printable substrate 70, dry lift adhesive 78, film layer 80, and cut line 60. Printable substrate 70 includes sheet layer 72, pressure sensitive adhesive 74, and film layer 76.

Printable blank sheet 10 is made out of printable substrate 70, dry lift adhesive 78 and film layer 80. Printable substrate 70 includes sheet layer 72, pressure sensitive adhesive 74, and film layer 76. A bottom face of sheet layer 72 is connected to a top face of film layer 76 with pressure sensitive adhesive 74. A bottom face of film layer 76 (the bottom face of printable substrate 70) is connected to a top face of film layer 80 with dry lift adhesive 78. In alternate embodiments, printable substrate 70 can include different or more layers, as long as printable blank sheet 10 is capable of being passed through a printer.

Sheet layer 72 forms the top layer of printable blank sheet 10. Sheet layer 72 is a paper layer in the embodiment shown, but can also be a synthetic material in alternate embodiments, such as polyester (PET), polypropylene, vinyl, or other printable synthetic materials.

Film layer 76 forms the middle layer of printable blank sheet 10. Film layer 76 is biaxially oriented polypropolyene (BOPP) in the embodiment shown, but can be any suitable film in alternate embodiments, including polyethelyene (PE), polyester (PET), and polyvinyl chloride (PVC).

Pressure sensitive adhesive 74 is used to connect a bottom face of sheet layer 72 to a top face of film layer 76. Pressure sensitive adhesive 74 is a pressure activated adhesive that will form a bond between sheet layer 72 and film layer 76 when they are pressed together.

Sheet layer 72, pressure sensitive adhesive 74, and film layer 76 form printable substrate 70. Printable substrate 70 can have a thickness between 0.004 inches (0.1016 millimeters) and 0.018 inches (0.4572 millimeters).

Film layer 80 forms the bottom layer of printable blank sheet 10. Film layer 80 is biaxially oriented polypropolyene (BOPP) in the embodiment shown, but can be any suitable film in alternate embodiments, including polyethelyene (PE), polyester (PET), and polyvinyl chloride (PVC). Film layer 80 can have a thickness between 0.0005 inches (0.0127 millimeters) and 0.004 inches (0.1016 millimeters).

Dry lift adhesive 78 is used to connect a bottom face of film layer 76 (the bottom face of printable substrate 70) to a top face of film layer 80. Dry lift adhesive 78 is a strong adhesive that is applied as a pattern so that there are areas of dead space between areas of dry lift adhesive 78. The high strength of dry lift adhesive 78 will hold object 12 in printable blank sheet 10 as printable blank sheet 10 is being sent through a printer. The pattern of dry lift adhesive 78 allows a corner of object 12 to be pulled up and away from film layer 80 in an area that has a dead space. Object 12 can then be fully removed from printable blank sheet 10 by pulling it off of film layer 80 along dry lift adhesive 78. The pattern of dry lift adhesive 78 also allows film layer 80 to be lifted away from printable substrate 70 in an area that has a dead space. Film layer 80 can then be fully removed from printable blank sheet 10 by pulling it off of printable substrate 70 along dry lift adhesive 78. In alternate embodiments, dry lift adhesive 78 can be applied with varying thicknesses. Areas with a lower thickness will be weak areas where object 12 can be separated from film layer 80.

Printable blank sheet 10 can be cut with cut line 60, as seen in FIG. 4B. Cut line 60 extends through printable substrate 70 and dry lift adhesive 78. Cut line 60 may extend a short distance into film layer 80, but will not cut through film layer 80. Cut line 60 is formed by die cutting through printable substrate 70 and dry lift adhesive 78. This form of cutting through a top layer but not through a bottom layer is known as kiss cutting. Cut line 60 allows a periphery of an object to be cut out of printable substrate 70 while still maintaining film layer 80 as a solid layer.

Cutting through a top layer (or layers) of printable blank sheet 10 but not through a bottom layer allows the top layer to be held on printable blank sheet 10 as printable blank sheet 10 is passed through a printer. After printable blank sheet 10 has been passed through a printer, the objects that have been cut into the top layer of printable blank sheet 10 can be pulled out of printable blank sheet 10 by separating the top layer from the bottom layer along dry lift adhesive 78. Dry lift adhesive 78 has a dry release so neither the object nor the bottom layer will have a sticky residue left on them after the object is removed from the bottom layer. In the embodiment seen in FIGS. 4A-4B, printable substrate 70 can be pulled off of film layer 80 along dry lift adhesive 78. A majority of dry lift adhesive 78 will remain on film layer 80, but neither printable substrate 70 nor film layer 80 will have a sticky residue on them. This is advantageous, as the object that is cut out of printable substrate 70 can then be used as a marketing material. Further, when multiple parts are included on a single sheet, one part can be removed and the remaining parts can be stored in the sheet.

Using dry lift adhesive 78 in printable blank sheet 10 is advantageous, as intricately shaped objects can be cut into printable substrate 70 and then easily removed from printable substrate 70 after printable blank sheet 10 has been run through a printer. Dry lift adhesives have been previously used with printable blank sheets when simple two-dimensional objects are being formed. A solid layer (known in the art as a flood coat) of the dry lift adhesive can be applied between two layers. In order for the simple two-dimensional structures to be removed, the dry lift adhesive had to have a weak strength so that the objects could be removed. The weak strength of the dry lift adhesive in previous printable blank sheets limited what objects could be cut into the sheet, as the dry lift adhesive was not strong enough to hold complex and intricate designs in the sheet when the sheet was being run through a printer. Thus, sheets were limited to simple two-dimensional objects with few cut lines, such as rectangular business cards.

Applying dry lift adhesive 78 as a pattern allows dry lift adhesive 78 to have a higher strength than previously used dry lift adhesives. The higher strength dry lift adhesive 78 is capable of holding intricately shaped objects with multiple cut lines in printable blank sheet 10 as printable blank sheet 10 is run through a printer. The objects can then be removed from printable blank sheet 10 by separating printable substrate 70 from film layer 80 where there is a dead space in dry lift adhesive 78. Applying dry lift adhesive 78 as a pattern allows intricate three-dimensional shapes to be cut into printable substrate 70 in the embodiment shown in FIG. 2 and intricate two-dimensional shapes to be cut into printable substrate 70 in the embodiment shown in FIG. 3. Objects with intricate shapes are objects that include at least one of the following features: shapes with curved edges; shapes with corners at non-square angles; shapes with edges running neither parallel nor perpendicular to each other; objects with flanges extending outward from a main body portion; objects that are shaped as irregular polygons; objects where at least a portion of the periphery of the object is curved; and objects with scored lines, perforated lines, or die cut lines on a body portion of the object. These complex and intricate shapes will remain attached to film layer 80 during printing due to the higher strength of the dry lift adhesive 78.

Figure 5A:
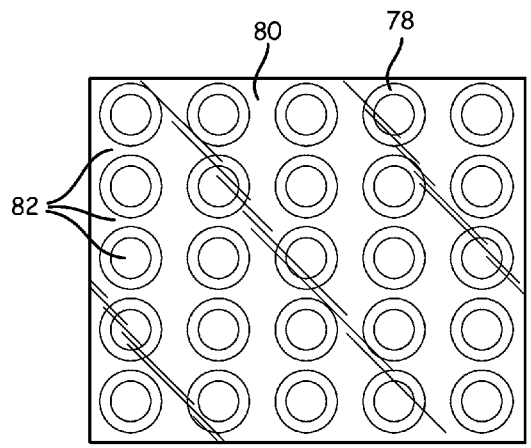
FIG. 5A is a front view of a first embodiment of a patterned laminating adhesive.
Figure 5B:
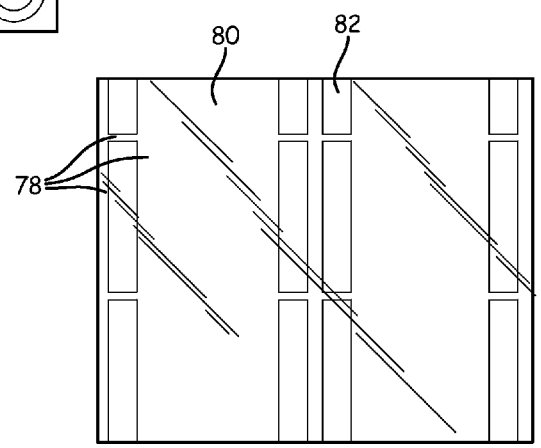
FIG. 5B is a front view of a second embodiment of a patterned laminating adhesive.
Figure 5C:
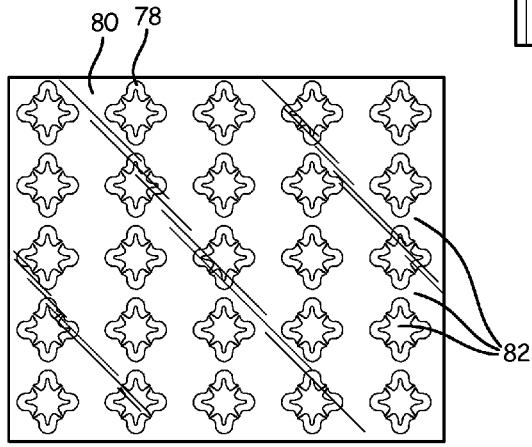
FIG. 5C is a front view of a third embodiment of a patterned laminating adhesive.

FIGS. 5A-5C show examples of a dry lift adhesive being applied as different patterned laminating adhesives 78. FIG. 5A is a front view of a first embodiment of patterned laminating adhesive 78. FIG. 5B is a front view of a second embodiment of patterned laminating adhesive 78. FIG. 5C is a front view of a third embodiment of patterned laminating adhesive 78. FIGS. 5A-5C include patterned laminating adhesive 78, film layer 80, and dead space 82. Patterned laminating adhesive 78 is a dry lift adhesive that is applied as a pattern to facilitate the easy removal of a top layer from film layer 80. Dead spaces 82 are the open spaces where patterned laminating adhesive 78 has not been applied.

As seen in FIG. 5A, patterned laminating adhesive 78 can be applied as a plurality of rings that are spaced apart. As seen in FIG. 5B, patterned laminating adhesive 78 can be applied with voided strips that are capable of being aligned with edges of the complex part. As seen in FIG. 5C, patterned laminating adhesive 78 can be applied as a plurality of V-shaped areas that are arranged in groups of fours and spaced apart.

Dead spaces 82 are positioned between and around patterned laminating adhesive 78. Dead spaces 82 are areas where patterned laminating adhesive 78 has not been applied. When a patterned laminating adhesive is used to connect two different layers of materials, dead spaces 82 provide areas where the layers can be pulled apart. This allows a user to begin to separate the layers along patterned laminating adhesive 78. Dead spaces 82 allow higher strength patterned laminating adhesives 78 to be used, as dead spaces 82 provide gaps in patterned laminating adhesive 78 so that different layers can be separated.

Figure 6:
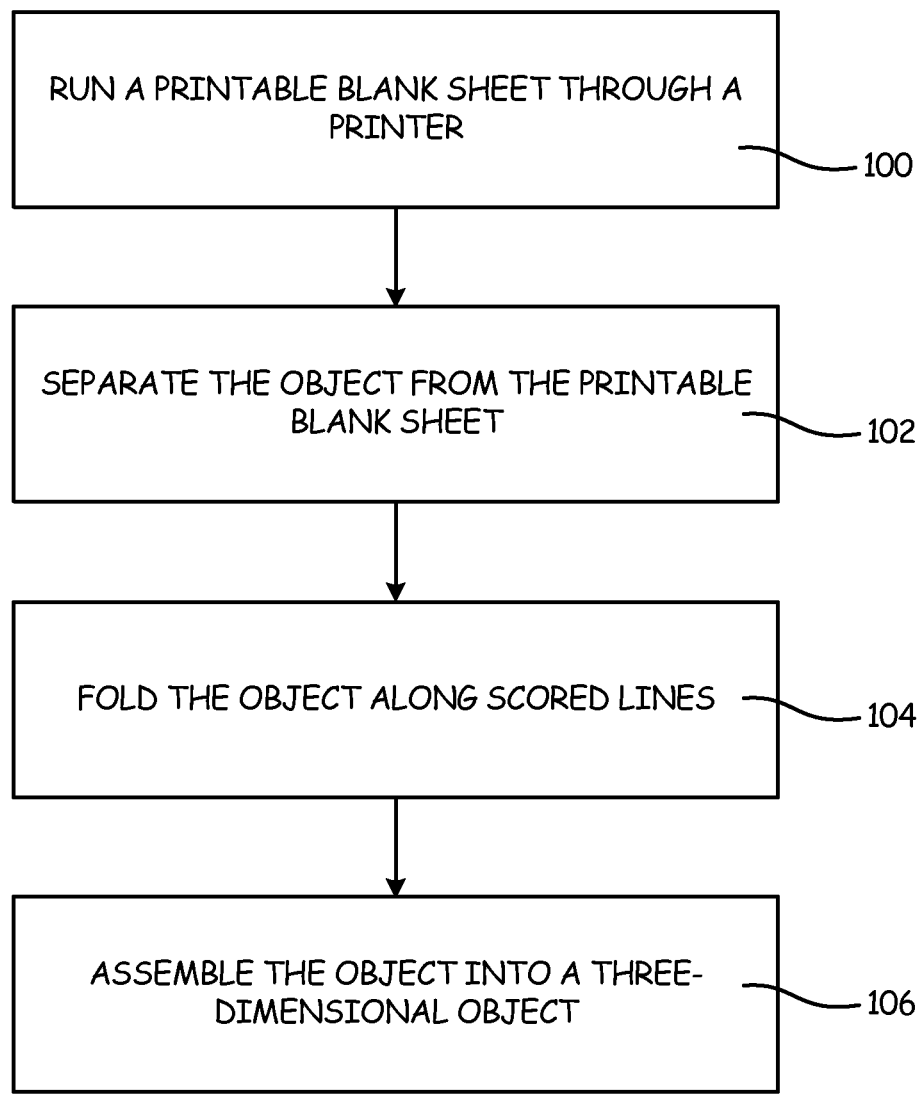
FIG. 6 is a flow chart showing how a three-dimensional object can be formed.
Figure 7:
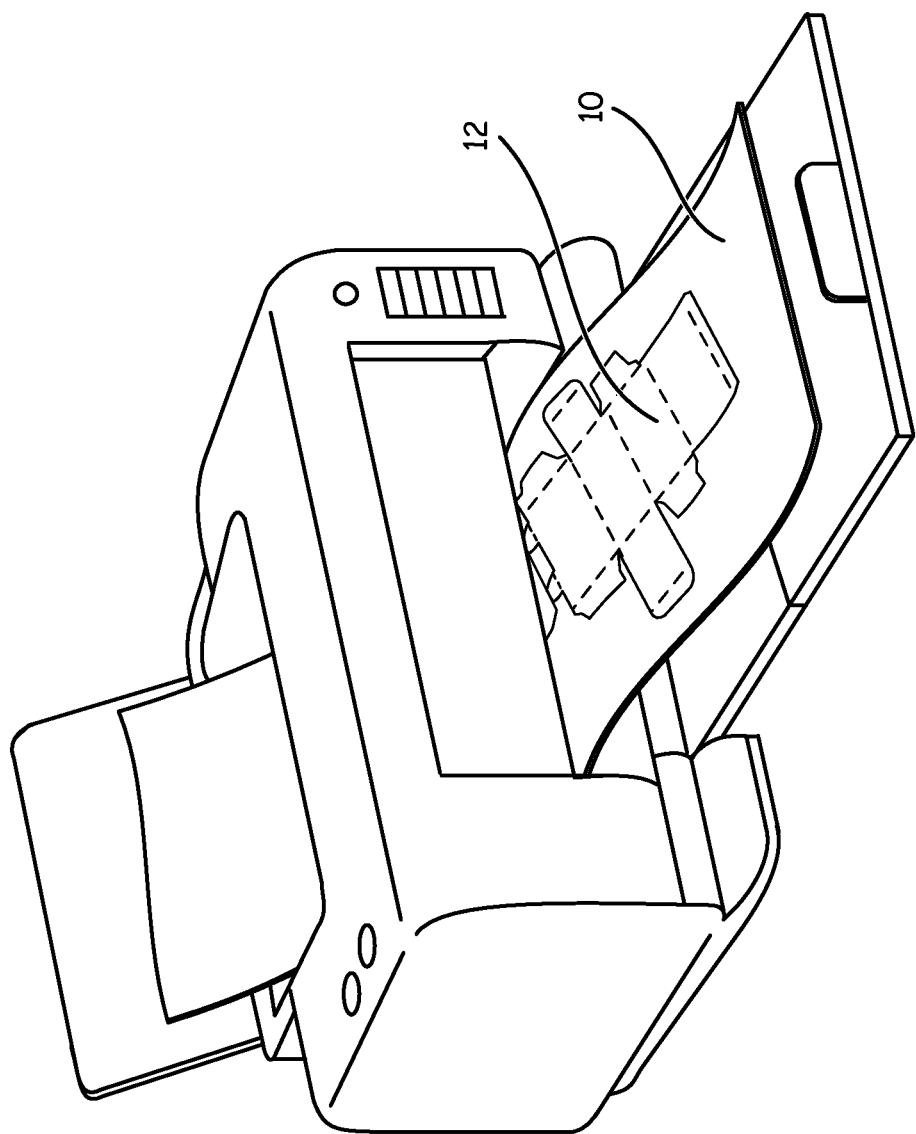
FIG. 7 is a perspective view of the printable blank sheet as it is being run through a printer.
Figure 8A:
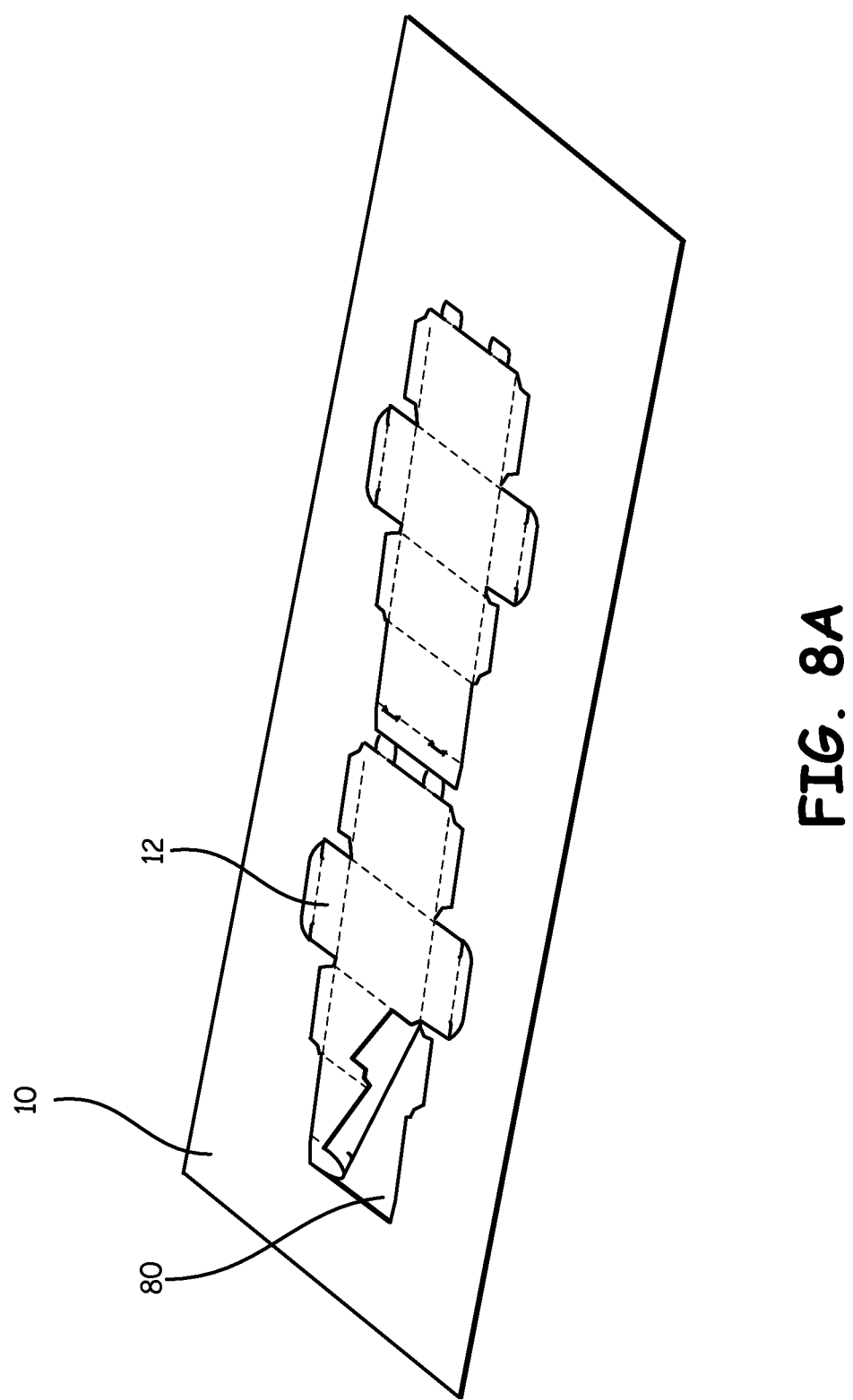
FIG. 8A is a perspective view of the printable blank sheet as a corner of an object is being lifted.
Figure 8B:
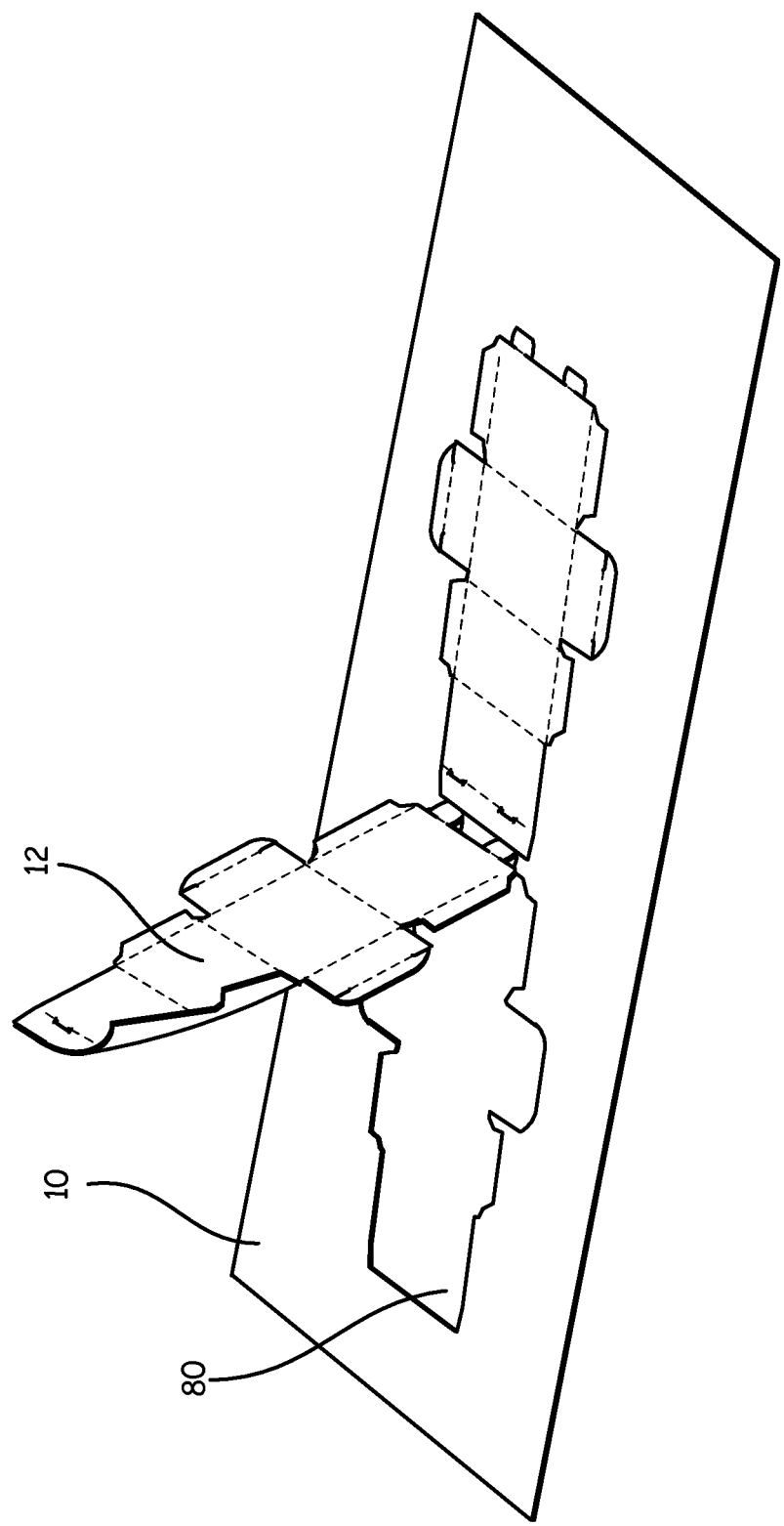
FIG. 8B is a perspective view of the printable blank sheet as the object is being peeled out of the printable blank sheet.
Figure 9B:
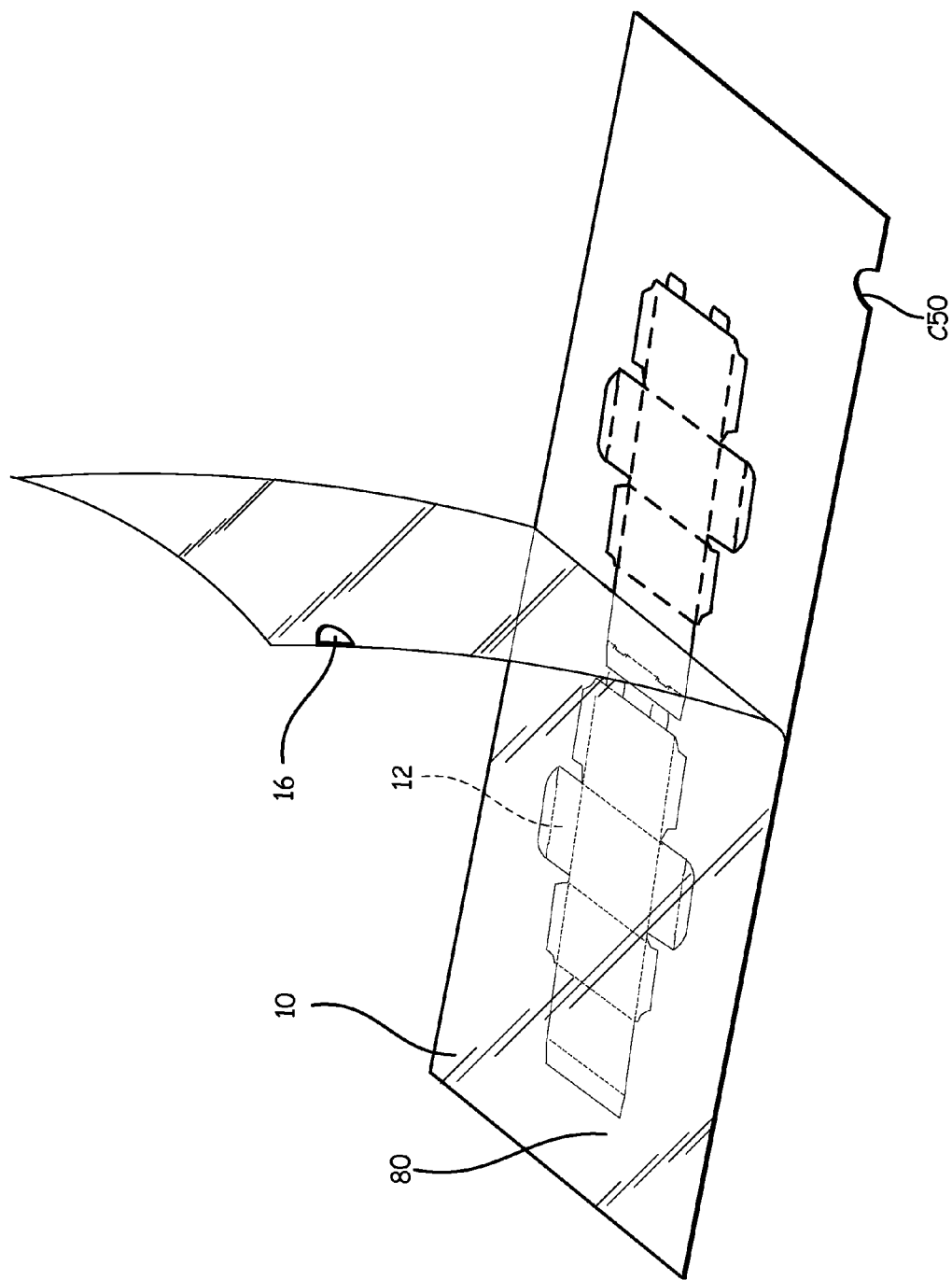
FIG. 9B is a perspective view of the printable blank sheet as the film layer is peeled off of the printable blank sheet.
Figure 10A:
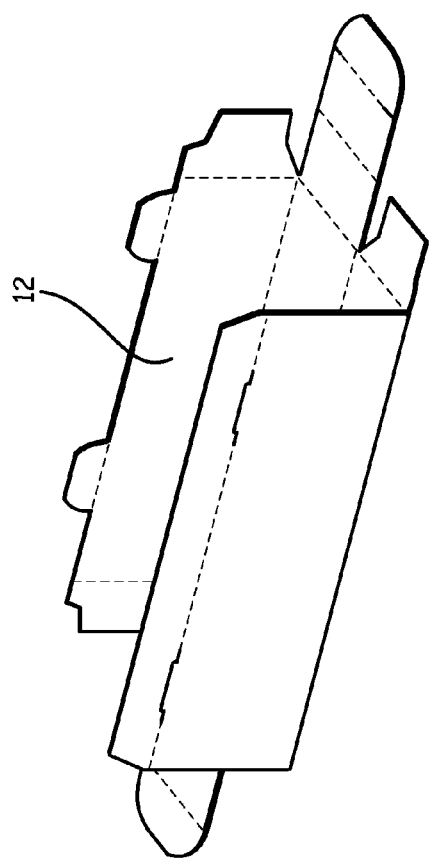
FIG. 10A is a perspective view of the object as it is being folded.
Figure 10B:
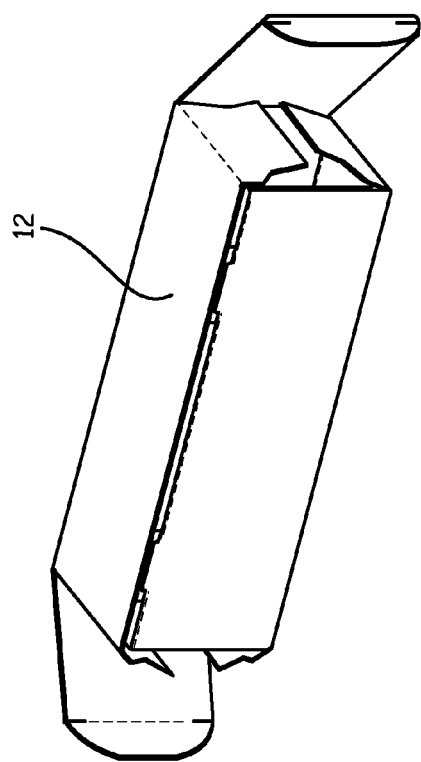
FIG. 10B is a perspective view of the object as it is being assembled into a three-dimensional structure.

FIG. 6 is a flow chart showing how three-dimensional object 12 can be formed. FIG. 6 includes steps 100, 102, 104, and 106 to show how three-dimensional object 12 can be formed. FIGS. 7-10B illustrate each of the steps seen in the flow chart in FIG. 6. FIG. 7 is a perspective view of printable blank sheet 10 as it is being run through a printer. FIG. 8A is a perspective view of printable blank sheet 10 as a corner of object 12 is being lifted. FIG. 8B is a perspective view of printable blank sheet 10 as object 12 is being peeled out of printable blank sheet 10. FIG. 9A is a perspective view of printable blank sheet 10 as a corner of film layer 80 is being lifted. FIG. 9B is a perspective view of printable blank sheet 10 as film layer 80 is peeled off of printable blank sheet 10. FIG. 9C is a perspective view of printable blank sheet 10 as object 12 is removed from excess sheet area 14. FIG. 10A is a perspective view of object 12 as it is being folded. FIG. 10B is a perspective view of object 12 as it is being assembled into a three-dimensional structure.

Step 100 includes running printable blank sheet 10 through a printer, as seen in FIG. 7. Printable blank sheet 10 includes printable substrate 70 that is attached to film layer 80 with dry lift adhesive 78. The top layer of printable substrate 70 is sheet layer 72 that is capable of being printed on. In the embodiment shown, sheet layer 72 is a paper layer but sheet layer 72 can be made out of any material that is capable of being printed on in alternate embodiments. Printable blank sheet 10 has a thickness between 0.004 inches and 0.018 inches to make it suitable for being passed through a standard printer. Further, printable blank sheet 10 is sized so that it can be passed through a standard printer.

Printable blank sheet 10 includes objects 12 that are positioned in printable blank sheet 10. Objects 12 are made out of printable substrate 70 and are attached to film layer 80 with dry lift adhesive 78. As printable blank sheet 10 is run through a printer, objects 12 are held in printable blank sheet 10 with dry lift adhesive 78. Dry lift adhesive 78 can be applied in a pattern so that there are areas filled with dry lift adhesive 78 and dead spaces 82 between objects 12 and film layer 80.

Automatic imposition software can be used to create the design that is to be printed on printable blank sheet 10. The automatic imposition software allows a user to create the design for one object 12 and then the design is automatically reproduced to be applied to every object 12 in printable blank sheet 10. The automatic imposition software will also orient the design so that it positioned properly on objects 12 in printable blank sheet 10. This allows objects 12 to be angled on printable blank sheet 10 for manufacturing purposes while still allowing a user ease when creating the design for the object.

Step 102 includes separating object 12 from printable blank sheet 10. Object 12 is separated from printable blank sheet 10 along dry lift adhesive 78. Object 12 can be separated from printable blank sheet 10 in a number of ways.

In a first embodiment, step 102 is broken into two additional steps. The first step is lifting a corner of object 12 that is held in printable blank sheet 10, as seen in FIG. 8A. After a top face of printable blank sheet 10 has been printed on, a corner of object 12 can be lifted out of printable blank sheet 10. Dry lift adhesive 78 holds objects 12 on film layer 80 and is applied as a pattern so that there are areas filled with dry lift adhesive 78 and dead spaces 82. A corner of object 12 can be lifted off of film layer 80 in an area of dead space 82. Dead space 82 allows there to be a gap between objects 12 and film layer 80. A user can use a finger or any other object to lift a corner of object 12 away from film layer 80.

The second step of the first embodiment includes peeling object 12 out of printable blank sheet 10, as seen in FIG. 8B. After a corner of object 12 is lifted, a user can grasp that corner to peel object 12 out of printable blank sheet 10. Object 12 will be separated from film layer 80 along dry lift adhesive 78 as object 12 is peeled out of printable blank sheet 10. A majority of dry lift adhesive 78 will remain on film layer 80 when object 12 is removed from film layer 80. Any dry lift adhesive 78 that remains on object 12 will be undetectable. Further, any dry lift adhesive 78 that remains on either object 12 or on film layer 80 will not be sticky, as dry lift adhesive 78 has a dry release when it is separated.

In a second embodiment, step 102 is broken into three additional steps. The first step is pulling a corner of film layer 80 off of printable blank sheet 10, as seen in FIG. 9A. After a top face of printable blank sheet 10 has been printed on, a corner of film layer 80 can be pulled away from printable blank sheet 10. This can be done by using notch 16. Notch 16 allows a user to easily separate film layer 80 from printable blank sheet 10 along dry lift adhesive 78. Notch 16 can be grasped and then pulled away from printable blank sheet 10, which effectively pulls film layer 80 away from printable substrate 70 along dry lift adhesive 78. Dry lift adhesive 78 holds objects 12 on film layer 80 and is applied as a pattern so that there are areas filled with dry lift adhesive 78 and dead spaces 82. Notch 16 allows a user to separate film layer 80 from printable blank sheet 10 in an area of dead space 82.

The second step of the second embodiment includes peeling film layer 80 off of printable blank sheet 10, as seen in FIG. 9B. After a corner of back layer 80 is separated from printable substrate 70, a user can place printable blank sheet 10 with printable substrate 70 face down. The user can then grasp notch 16 and peel film layer 80 off of printable blank sheet 10. Film layer 80 will be separated from printable blank sheet 10 along dry lift adhesive 78. A majority of dry lift adhesive 78 will remain on film layer 80 when film layer 80 is peeled off of printable blank sheet 10. Any dry lift adhesive 78 that remains on object 12 will be undetectable. Further, any dry lift adhesive 78 that remains on either object 12 or on film layer 80 will not be sticky, as dry lift adhesive 78 has a dry release when it is separated.

The third step of the second embodiment includes removing object 12 from excess sheet area 14, as seen in FIG. 9C. After film layer 80 is removed from printable blank sheet 10, printable substrate 70 is left. Printable substrate 70 includes object 12 and excess sheet area 14. Object 12 is cut through printable substrate 70 and excess sheet area 14 surrounds object 12. Object 12 can be easily removed from excess sheet area 14 by simply lifting it out of excess sheet area 14.

Step 106 includes folding object 12 along scored lines S, as seen in FIG. 10A. After object 12 has been removed from printable blank sheet 10, object 12 will be a flat that is capable of being assembled into a three-dimensional structure. Object 12 includes a plurality of scored lines S along which object 12 can be folded. Scored lines S are areas where object 12 has been weakened by putting pressure on object 12 to weaken the layers of material that make up object 12. Object 12 can then be easily folded along the weakened scored lines S.

Step 108 includes assembling object 12 into a three-dimensional structure, as seen in FIG. 10B. After object 12 has been folded along scored lines S, object 12 can be assembled into a three-dimensional structure using tabs and die cuts that are present on object 12. Object 12 includes die cuts in object 12 in which a tab can be placed to hold object 12 in a certain position. Further, other tabs that are present on object 12 can be placed in gaps between sides of object 12 to hold object 12 in a certain position. This will fully assemble object 12 into a three-dimensional structure.

Printable blank sheet 10 is advantageous, as objects 12 can be cut out of printable substrate 70 and then separated from film layer 80. Cutting objects 12 out of printable substrate 70 will give objects 12 smooth edges, making objects 12 suitable for use as marketing materials. Further, it is easy to remove objects 12 from printable blank sheet 10 and objects 12 will not tear as they are removed. This is advantageous over previous printable blank sheets that utilized perforations or bridges to hold objects 12 in printable blank sheet 10.

Steps 100-102 can also be followed to form two-dimensional objects 12. Two-dimensional objects 12 with intricate shapes can be printed on and then removed from printable blank sheet 10 in the same manner as for three-dimensional objects 12.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A printable blank sheet comprising: a sheet with a top substrate and a bottom layer; a dry lift adhesive connecting the top substrate to the bottom layer; cut lines in the sheet that extend through the top substrate and the dry lift adhesive but not through the bottom layer; an object with an intricate shape cut into the top substrate with an entire periphery of the object defined by the cut lines, wherein the object can be removed from the sheet by separating the object and the bottom layer along the dry lift adhesive, and wherein the object and the bottom layer have dry surfaces when they are separated along the dry lift adhesive; an excess sheet area of the top substrate that surrounds the object; and a notch cut line extending through the top substrate and the dry lift adhesive but not through the bottom layer, wherein the notch cut line defines a notch at an edge of the sheet that is configured to be grasped to pull the bottom layer away from the top substrate along the dry lift adhesive and wherein the top substrate comprises: a sheet layer that is capable of being printed on; a film layer; and a pressure sensitive adhesive that connects a bottom face of the sheet layer to a top face of the film layer.

2. The printable blank sheet of claim 1, wherein the dry lift adhesive is applied in a pattern.

3. The printable blank sheet of claim 2, wherein the pattern is a voided pattern with areas covered with dry lift adhesive and areas that are open space.

4. The printable blank sheet of claim 3, wherein the top substrate can be separated from the bottom layer in the areas of open space in the pattern.

5. The printable blank sheet of claim 1, wherein the bottom layer of the sheet is a film layer.

6. The printable blank sheet of claim 1, wherein the object is a flat box that is capable of being assembled into a three-dimensional box after it has been removed from the sheet.

7. The printable blank sheet of claim 6, wherein the flat box has a plurality of scored lines along which the flat box can be folded, and a plurality of tabs and die cut lines that can be used to assemble the flat box.

8. A printable blank sheet comprising:
a sheet including a sheet layer, a first film layer, and a second film layer;
a pressure sensitive adhesive that attaches a bottom face of the sheet layer to a top face of the first film layer;
a dry lift adhesive that attaches a bottom face of the first film layer to a top face of the second film layer, wherein the dry lift adhesive is applied in a pattern;
a cut extending through the sheet layer, the pressure sensitive adhesive, the first film layer, and the dry lift adhesive but not through the second film layer, wherein the cut surrounds an entire periphery of an object formed by the sheet layer, the pressure sensitive adhesive, and the first film layer, and wherein the object can be separated from the sheet along the dry lift adhesive;
an excess sheet area formed by the sheet layer, the pressure sensitive adhesive, and the first film layer that surrounds the object; and
a notch cut line extending through the sheet layer, the pressure sensitive adhesive, the first film layer, and the dry lift adhesive but not through the second film layer, wherein the notch cut line defines a notch at an edge of the sheet that is configured to be grasped to pull the second film layer away from the first film layer along the dry lift adhesive.

9. The printable blank sheet of claim 8, wherein the dry lift adhesive has a voided pattern with areas covered with dry lift adhesive and areas that are open space.

10. The printable blank sheet of claim 9, wherein the sheet layer and the first film layer can be separated from the second film layer in the areas of open space in the pattern.

11. The printable blank sheet of claim 8, wherein the second film layer has a thickness of about 0.0005 inches to 0.004 inches.

12. The printable blank sheet of claim 8, wherein the object has a thickness of about 0.004 inches to 0.018 inches.

13. The printable blank sheet of claim 8, wherein the object is capable of being assembled into a three-dimensional structure after it has been separated from the sheet.

14. A method of creating a custom print object, the method comprising:
running a printable blank sheet through a printer, wherein the sheet includes a top substrate that is attached to a back layer with a dry lift adhesive, wherein the top substrate is printed on when the printable blank sheet is run through the printer, wherein the sheet has cut lines extending through the top substrate and the dry lift adhesive but not through the back layer, and wherein the cut lines define an entire periphery of an object with an intricate shape formed in the top substrate of the sheet and an excess sheet area of the top substrate that surrounds the object, and separating the object from the back layer along the dry lift adhesive by grasping a notch to pull the back layer away from the top substrate along the dry lift adhesive, wherein the notch is cut into the printable blank sheet with a notch cut line that extends through the top substrate and the dry lift adhesive but not through the back layer, and wherein the object and the back layer have dry surfaces when they are separated along the dry lift adhesive and wherein the top substrate comprises: a sheet layer that is capable of being printed on; a film layer; and a pressure sensitive adhesive that connects a bottom face of the sheet layer to a top face of the film layer.

15. The method of claim 14, wherein separating the object from the back layer along the dry lift adhesive further comprises:
lifting a corner of the object in the sheet; and
peeling the object out of the sheet by separating the object from the dry lift adhesive and the back layer.

16. The method of claim 14, wherein separating the object from the back layer along the dry lift adhesive further comprises:
pulling a corner of the back layer away from the printable blank sheet using the notch that is cut into the top substrate;
peeling the back layer off of the sheet by separating the back layer from the dry lift adhesive and the top substrate; and
removing the object from an excess sheet area of the top substrate.

17. The method of claim 14, and further comprising:
folding the object along scored lines; and
assembling the object into a three-dimensional structure.

18. The method of claim 14, wherein the dry lift adhesive is applied with a voided pattern with areas covered with dry lift adhesive and areas that are open space.

19. The printable blank sheet of claim 14, wherein the back layer has a thickness of about 0.0005 inches to 0.004 inches.

* * * * *